United States Patent
Fich et al.

(10) Patent No.: US 8,823,304 B2
(45) Date of Patent: Sep. 2, 2014

(54) POWER SUPPLY SYSTEM AND METHOD FOR CONTROLLING A MECHANICALLY COMMUTATED ELECTRIC MOTOR

(75) Inventors: Preben Bo Fich, Sandgate Kent (DK); Curt Michael Petersen Willadsen, Espergaerde (DK)

(73) Assignee: Ideassociates (IOM) Limited, Douglas, Isle of Man (GB)

( * ) Notice: Subject to any disclaimer, the term of this patent is extended or adjusted under 35 U.S.C. 154(b) by 665 days.

(21) Appl. No.: 13/123,584

(22) PCT Filed: Oct. 10, 2008

(86) PCT No.: PCT/DK2008/000353
§ 371 (c)(1),
(2), (4) Date: Jul. 26, 2011

(87) PCT Pub. No.: WO2010/040349
PCT Pub. Date: Apr. 15, 2010

(65) Prior Publication Data
US 2011/0273123 A1    Nov. 10, 2011

(51) Int. Cl.
*H02P 27/00* (2006.01)
(52) U.S. Cl.
USPC .......... 318/400.3; 318/542; 318/400.34; 318/400.35; 318/430
(58) Field of Classification Search
CPC ............... H02P 6/00; H02P 6/12; H02P 6/18
USPC .......... 318/139, 400.01, 400.32, 400.34, 536, 318/541, 542, 799, 400.35, 400.3, 254.1, 318/430; 324/255, 500, 522, 536
See application file for complete search history.

(56) References Cited

U.S. PATENT DOCUMENTS

| | | | |
|---|---|---|---|
| 3,727,133 A * | 4/1973 | Marvin et al. | 324/765.01 |
| 5,550,446 A | 8/1996 | Schlager et al. | |
| 6,850,023 B2 | 2/2005 | Lau | |
| 8,018,188 B2 * | 9/2011 | Schwarzkopf et al. | 318/400.35 |
| 2007/0194736 A1 | 8/2007 | Pino et al. | |
| 2008/0088268 A1 | 4/2008 | Sakaguchi | |
| 2008/0298784 A1 * | 12/2008 | Kastner | 388/811 |

FOREIGN PATENT DOCUMENTS

| | | |
|---|---|---|
| CN | 101006638 | 7/2007 |
| CN | 101258673 | 9/2008 |
| DE | 10242406 A1 | 3/2004 |
| EP | 1772954 A2 | 11/2007 |

(Continued)

OTHER PUBLICATIONS

Russian Application No. 2011118368/07 (027156) Decision on Grant A Patent For Invention, dated Nov. 26, 2012.
Chinese Office Action and Search Report in application No. 200880131450.7, Feb. 16, 2013.

(Continued)

*Primary Examiner* — Antony M Paul
(74) *Attorney, Agent, or Firm* — Browdy and Neimark, PLLC (57) ABSTRACT

The invention relates to a method for providing a trigger signal in response to the commutation of a mechanically commutated electric motor (1). The method comprising the steps of providing a mechanically commutated electric motor (1), providing a power supply for said mechanically commutated electric motor via electrical supply leads (10, 11) from power supply circuitry, providing a filter (15) connected to said electrical supply leads (10, 11), detecting with said filter (15) a voltage spike occurring at commutation, outputting from said filter (15) said trigger signal.

18 Claims, 6 Drawing Sheets

(56) References Cited

FOREIGN PATENT DOCUMENTS

| | | |
|---|---|---|
| RU | 2047265 | 10/1995 |
| SU | 5511784 | 3/1977 |
| WO | 2007028384 A1 | 3/2007 |

OTHER PUBLICATIONS

Mills, C. J., "An Almost-Accurate Rotation Counter" Ideas for Design, May 13, 1998 p. 134 XP-000833706.
State Intellectual Property Office of People's Republic of China Second Office Action issued on Oct. 21, 2013.

* cited by examiner

POWER SUPPLY SYSTEM AND METHOD FOR CONTROLLING A MECHANICALLY COMMUTATED ELECTRIC MOTOR

The present invention relates to a method for providing a trigger signal in response to the commutation of a mechanically commutated electric motor. The present invention also relates to a power supply system for a mechanically commutated electric motor.

Mechanically commutated electric motors, i.e. motors where a brush and commutator arrangement changes the polarity of the current in the armature windings, as the armature rotates, within magnetic fields produced by the stator, are well known in the art. The magnetic fields in such motors may be produced by means of permanent magnets or electromagnets. If the magnetic field is provided by electromagnets, the current in the windings, which produce the magnetic field of the stator, may be provided by a separate magnetizing current, or it may be provided by the same current as the one passing through the armature windings. The latter is commonly referred to as a universal motor, as it is also quite suitable for AC, as long as the AC frequency it not too high. Such a universal motor works very well at the most commonly used AC frequencies such as 16⅔ Hz, 50 Hz or 60 Hz.

The mechanically commutated permanent magnet DC motor is the most commonly used motor for small and medium electric and electronic devices. Consequently such motors are produced in very large numbers, hence making them very cheap. For controlling such motors it is well known to supply the current by means of pulse modulated current.

Many attempts to determine the commutation of mechanically commutated electric motors have been made, e.g. providing the motor with indicators, such as tachos, or by ripple counting on the supply current to the motor, i.e. the fluctuations on the supply current caused by the fact that the current in a coil cannot change momentarily, because of the back electromotive force. One such attempt is described in as described in EP-A-1772954. Such ripple counting is difficult because the commutator contacts normally supply current to several windings at the time in an overlapping manner.

One of the reasons for the desire to determine the commutation stems from one of the well known drawbacks of the mechanically commutated electric motor, that is, the arcing which occurs when the motor commutates. At each commutation point, when the brush breaks contact with a commutator segment, the energy stored in the motor winding as a magnetic field causes an arc or voltage spike between the brush and the commutator segment when the magnetic field collapses. This occurs not only during normal commutation but also in situations where the brushes bounce on the rotating commutator.

The arc is undesired for two major reasons. The first major reason is that the arc generates quite a lot of high frequency electromagnetic noise, which is radiated from the motor, and may cause undesired electromagnetic interference with other apparatuses. The other major reason it that the arc, which consists of hot plasma, causes mechanical wear on the electric motor, such as the commutator itself and the brushes.

It is the object of the invention to detect the commutation of a mechanically commutated motor in order to inter alia overcome these arcing problems.

According to a first aspect of the present invention this object is achieved by a method for providing a trigger signal in response to the commutation of a mechanically commutated electric motor, said method comprising the steps of: providing a mechanically commutated electric motor, providing a power supply for said mechanically commutated electric motor via electrical supply leads from power supply circuitry, providing a filter connected to at least one of said electrical supply leads, detecting with said filter a voltage spike occurring at commutation, outputting from said filter a trigger signal.

By use of such a filter it becomes possible to derive the reverse voltage spike generated when the impedance increases because the brush disengages its contact with the conducting pads of the commutator at commutation. The invention realises that, as opposed to the fluctuations in the ripple counting, this reverse spike is readily detectable, as the duration and magnitude thereof may even cause a spike with negative polarity as compared to the supply voltage.

According to a second aspect of the present invention this object is achieved by a power supply system for a mechanically commutated electric motor, said power supply system comprising: power supply circuitry, electrical supply leads for conducting electrical power from said power supply circuitry to a mechanically commutated electric motor, a filter connected to said electrical supply leads, a line for transmitting a trigger signal outputted from said filter as a stop signal to the power supply, wherein said pulse modulating circuitry comprising means for receiving said stop signal and means for halting temporarily the power supply to said mechanically commutated electric motor in response to said stop signal.

Hereby arcing can be avoided as the current is interrupted in the solid state devices of the power supply, rather than in the mechanical contacts of the commutator.

According to a first preferred embodiment of the first aspect of the invention said method further comprises the steps of using said trigger signal as a stop signal to the power supply, and halting temporarily said power supply to said mechanically commutated electric motor in response to said stop signal.

According to a preferred embodiment of the method according to the invention, said power supply circuitry comprises a pulse modulating circuitry, and said stop signal is used as a reset signal for said pulse modulating circuitry. By resetting the pulse modulating circuitry directly based on the stop signal from the filter, a very quick response and halting of the power supply can be achieved, thus quenching the arc at the first sign of it occurring.

According to a further preferred embodiment of the method according to the invention, said power supply circuitry comprises a microprocessor. A microprocessor is versatile and moreover allows the logging of the precise time when commutation occurs.

According to another preferred embodiment of the method according to the invention, a predetermined delay of the operation of the pulse modulating circuitry is provided after said reset. This ensures that sufficient distance between commutator and brush exists before the current supply is resumed, thus preventing later occurrence of the arc.

According to yet another preferred embodiment according to the invention, said pulse modulating circuitry provides pulse width modulated power. Pulse width modulation is readily achievable using microprocessors or multi-vibrator circuits.

According to a first embodiment of the power supply system according to the invention, said power supply circuitry comprises a pulse modulating circuitry and said means for receiving said stop signal is a reset input said pulse modulating circuitry. By using a reset input for resetting the pulse modulating circuitry directly based on the stop signal from the filter, a very quick response and halting of the power supply can be achieved, thus quenching the arc at the first sign of it occurring.

According to a further embodiment of the power supply system according to the invention, said power supply circuitry comprises a microprocessor. A microprocessor is versatile and moreover allows the logging of the precise time when commutation occurs.

According to another preferred embodiment of the power supply system according to the invention, means are provided for introducing a predetermined delay of the operation of the pulse modulating circuitry after said reset. This ensures that sufficient distance between commutator and brush exists before the current supply is resumed, thus preventing later occurrence of the arc.

According to yet another preferred embodiment of the power supply system according to the invention, said pulse modulating circuitry is adapted to provided pulse width modulated power. A microprocessor is versatile and moreover allows the logging of the precise time when commutation occurs.

As a bonus effect of being able to detect the voltage spikes occurring at commutation with the filter used in the present invention, the invention allows detailed monitoring of a mechanically commutated electric motor.

Thus according to a third aspect expressed in a further preferred embodiment of the invention there is provided a method further comprising identifying and storing by means of said microprocessor, temporal information about the occurrence of said voltage spikes for a number of commutations, so as to determine a pattern.

Such a pattern of temporal information about the voltage spikes provides an individual characteristic for a mechanically commutated motor, allowing inter alia the detection of major faults such as failure of a motor winding.

In a preferred embodiment of the third aspect of the invention, said temporal information comprises the temporal spacing between said voltage spikes. Any mechanically commutated motor has minor differences in the spacing of the contact pads of the commutator. These are readily detectable with the method of the invention, and accordingly can be used as an individual characteristic. E.g. one of the commutations could be designated to serve as a reference, thus readily allowing the calculation of numbers of revolution, or allowing identification of which particular winding has failed.

In a further preferred embodiment of the third aspect invention, said temporal information comprises the width of said voltage spikes or even the curve shape of the spikes over their respective duration. This further helps in the detection of faults, as it allows e.g. wear on inter alia the edges of the commutator pads to be detected, because this will influence the occurring voltage spike.

In a particularly preferred embodiment of the method according to the third aspect of the invention, the method comprises the detection of subsequent voltage spikes, and comparison of the respective temporal information related to said spikes with said pattern. Thus any changes to the mechanically commutated motor over its service life can be detected and precautions be taken if said subsequent spikes do not match said pattern.

According to a preferred embodiment of the third aspect of the invention, said precautions comprise issuance of a warning. The warning may then allow further precautions to be taken, e.g. replacement of the mechanically commutated motor before terminal failure.

According to a further preferred embodiment an angular position the mechanically commutated motor is determined based on said detection of subsequent voltage spikes. Having an identifiable reference allows the motor to be reset to a predetermined angular position, even if track of individual commutations have been lost, e.g. if the motor armature moves during a power failure or any other disconnection of power.

The invention will now be described in greater detail based on non-limiting exemplary embodiments and the drawings, on which.

Figure 1:
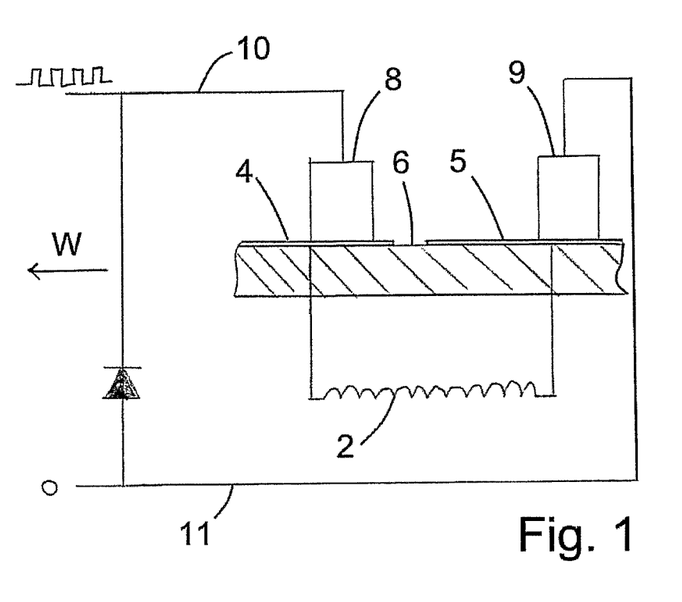
FIG. 1 schematically shows a commutator and a brush in a first position.
Figure 3:
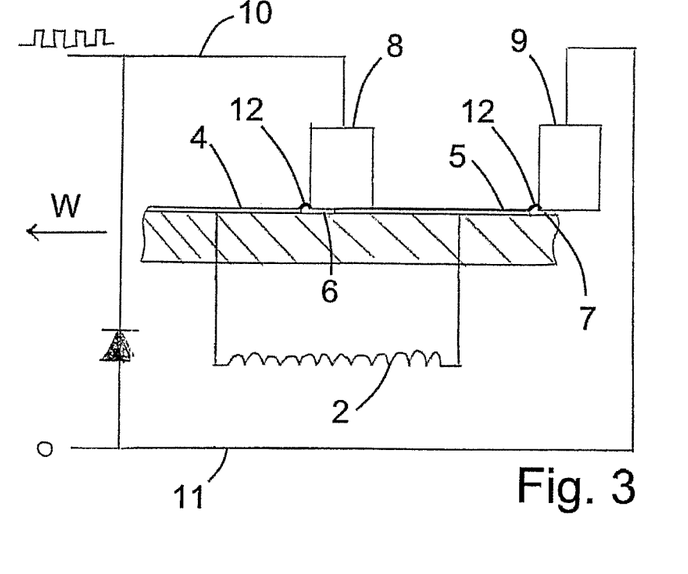
FIG. 3 schematically shows a commutator and a brush in a third position.
Figure 4:
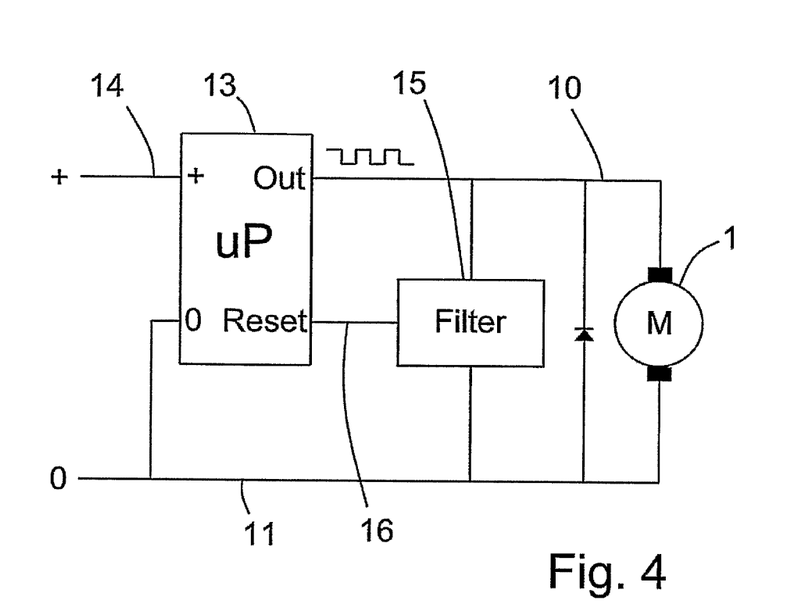
FIG. 4 schematically shows a microprocessor controlled mechanically commutated motor with a filter for detecting commutation.

FIG. 1 shows a very simplified diagram of a commutator arrangement of a mechanically commutated motor 1 as used in FIGS. 3 and 4. A commutator is a rotating switch, which alters the polarity of the current supplied to a magnetizing winding 2 of an electromagnet, and thus the polarity thereof. Because the commutator rotates it is normally cylindrical, but for illustration purposes it is here shown rectilinear. The schematically illustrated commutator comprises a substrate 3, which rotates with the motor armature in the direction indicated with the arrow W. On the surface of the substrate there is located a number of contact pads 4, 5, separated by gaps 6, 7. For illustration purposes only two contact pads 4, 5 are shown. The contact pads 4, 5 are engaged by two brushes 8, 9, so that current flows from a power source (not shown) connected to the current supply lead 10 via the brush 8 to the contact pad 4. From the contact pad 4 the current flows through the magnetizing winding 2 to the other contact pad 5 and via the other brush 9 and the return lead 11 back to the power source. During rotation of the commutator, the brush 8 engages the contact pads 4 and 5 in an alternating fashion, while the other brush 9 engages the respective other contact pads. Thereby the polarity of the magnetizing winding 2 reverses and drives the motor 1.

Figure 2:
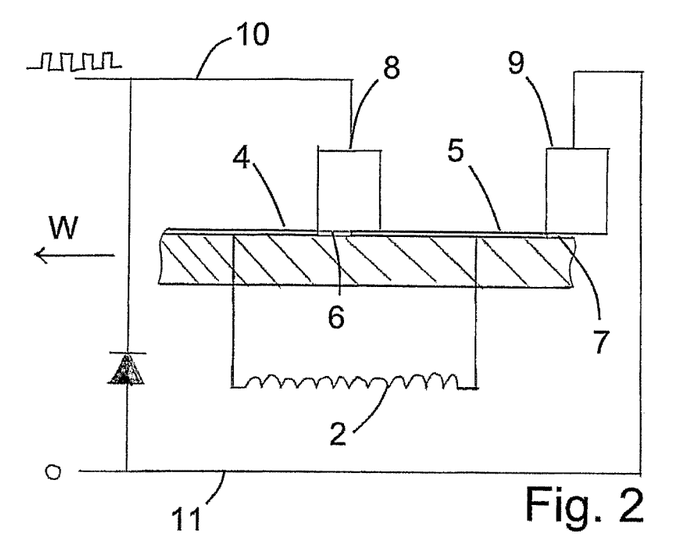
FIG. 2 schematically shows a commutator and a brush in a second position.

In FIG. 2 it can be seen that the substrate 3 has moved towards the left in the direction of the arrow W, so that the brush 8 has engaged the contact pad 5 and is just about to disengage the contact pad 4. Likewise the brush 9 is just about to disengage the contact pad 5. Though not illustrated the brush 9 would have engaged the next contact pad. If the commutator arrangement only has those two contact pads 4, 5, it would thus have engaged contact pad 4.

At the moment the brushes 8, 9 disengage the contact pads 4, 5 a substantial magnetic energy remains stored in the magnetizing winding. This energy gives rise to a voltage spike, with sufficient voltage to initiate an arc 12 between a contact pad 4, 5 and the respective brush 8, 9, as illustrated in FIG. 3. Moreover, the energy stored is sufficient to maintain the arc 12 even as the distance between the contact pad and the respective brush 8, 9 increases, thus giving rise to a powerful arc 12, which generates electromagnetic noise, and evaporates material from the edge of the contact pads 4, 5.

In the present invention it has been realised that the voltage spike can be detected using appropriate filtering, and that using this detection the arc 12 may be quenched before it actually starts developing. In particular, the present invention provides a filter circuit, which allows the unambiguous and reliable detection of the specific voltage spikes from the commutation even if the power supply is pulse modulated.

FIG. 4 schematically illustrates an exemplary circuit for quenching the arc 12 in the commutator. Power from an external power source (not shown) is supplied to a microprocessor 13 on a supply lead 14. The microprocessor is adapted for and programmed to output a pulse modulated pulse train, e.g. pulse width modulated pulse train on the supply lead 10 to the mechanically commutated electric motor 1. The skilled person will realise that if the power rating of the mechanically commutated electric motor 1 exceeds the maximum output power, which the microprocessor 13 is able to deliver, a driver circuit could be used to amplify the pulse modulated pulse train. The skilled person will also realise that other ways of generating a pulse modulated pulse train could be employed, e.g. a multi-vibrator embodiment using a multi-vibrator chip, and that details explained below with regard to the microprocessor embodiment may also be applicable in a multi-vibrator embodiment.

As can also be seen from FIG. 4, a filter 15 is connected to the supply lead 9. The filter 15 filters out the commutation spikes and provides an output signal, which is supplied to an input of the microprocessor 13 via line 16. It should be noted that FIG. 4 is schematic and that the filter 15 is not necessarily only connected to the supply lead 9 in a single point. In the embodiment shown, the input of the microprocessor 13 to which the output signal is supplied is the reset terminal. Thus, when the commutation spike occurs, the microprocessor is reset, and consequently immediately, that is within nanoseconds, halts the supply of power to the mechanically commutated motor. This quenches the arc before it actually starts building up. By the time after the reset when the microprocessor resumes the supply of pulse modulated current to the motor, the sufficient part of the energy of the magnetizing winding has dissipated and the air gap 6, 7 between the contact pads 4, 5 and the brush 8, 9 grown sufficiently to prevent the re-ignition of the arc. If necessary, a sufficient delay can be programmed into the microprocessor 13 to ensure this.

As will be explained further below, the input signal of the filter 15 may instead be supplied to other inputs of the microprocessor for analysis of the spikes etc.

Figure 5:
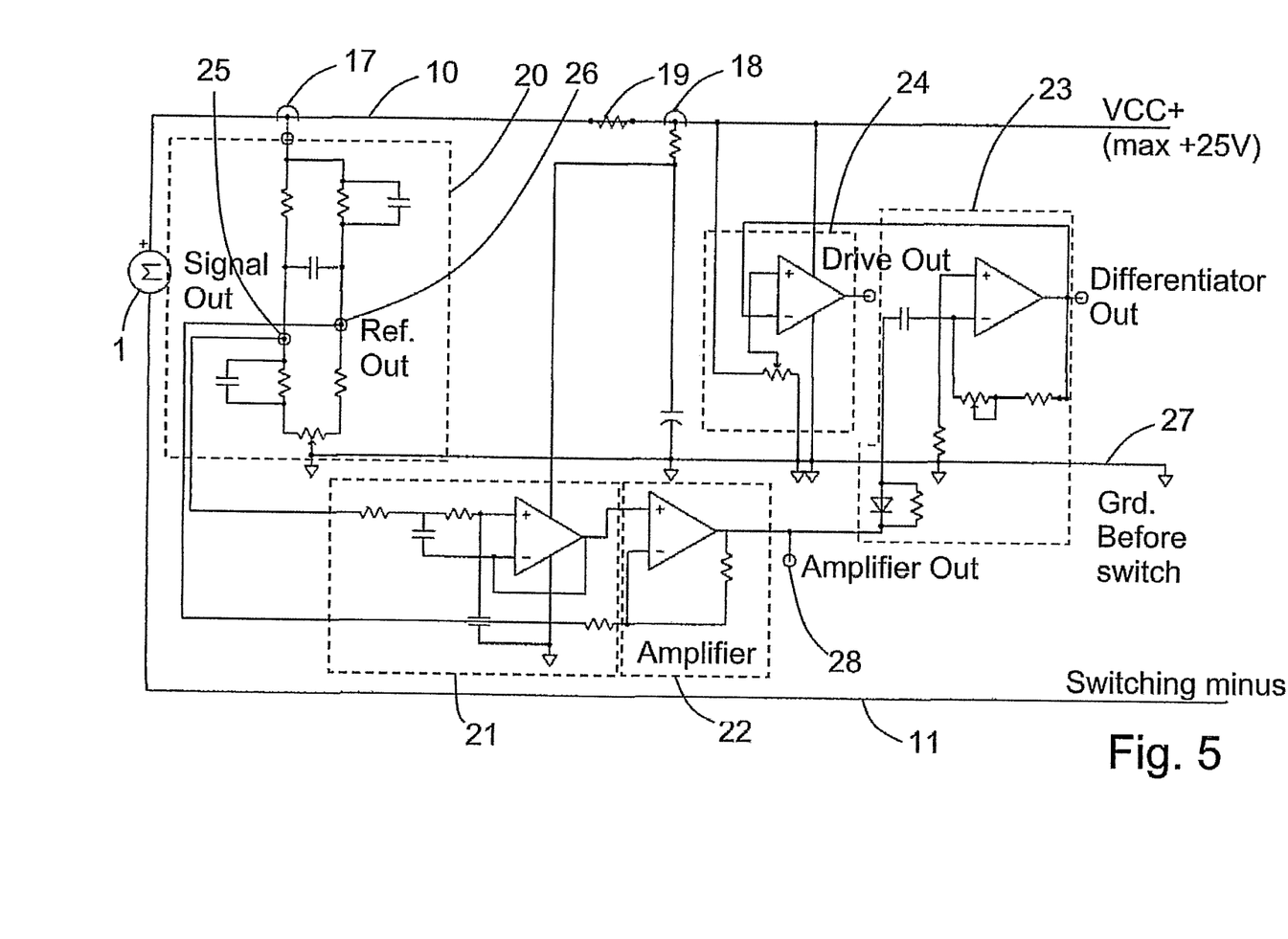
FIG. 5 shows a filtering circuit for detecting commutation.

In FIG. 5 an exemplary filter 15 according to the present invention is illustrated. The filter 15 is connected to the supply lead 10 in two points 17, 18 on either side of a measuring resistance 19. The measuring resistance 19 need not be a discrete component but can be constituted by an appropriate length of the supply lead 11.

The filter 15 comprises three filtering elements illustrated with boxes in broken lines, that is a Wheatstone's bridge 20, a low pass filter 21 and a differentiator 23. Further the filter optionally comprises two amplifiers also illustrated with boxes in broken lines, that is an amplifier 22 for amplifying the output signal from the low pass filter 21, and a driver circuit 24 for amplifying the output signal from the differentiator 23.

The functionality of the filter 15 of FIG. 5 is illustrated in FIGS. 6-9 by curve forms measured at various points in the filter 15, during supply of a mechanically commutated 8 pole dc motor from Mabuchi.

Figure 6:
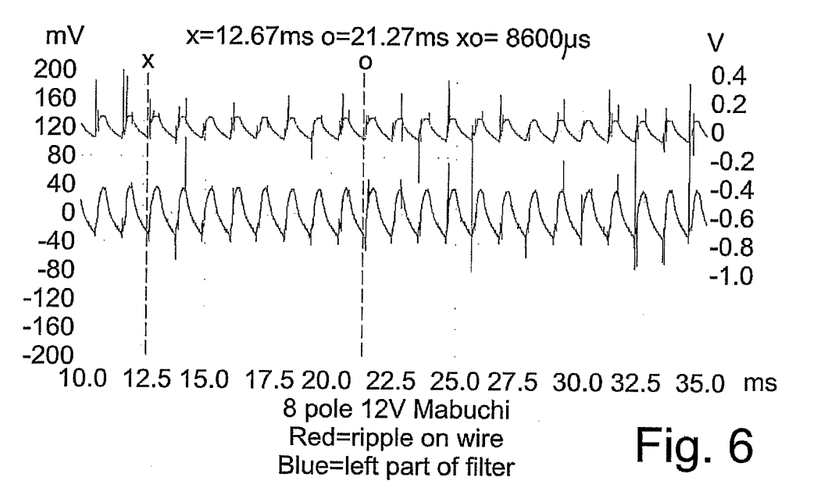
FIGS. 6-9 shows curve forms of signals measured at various in the filtering circuit of FIG. 5, and FIG. 10 schematically shows a mechanically with filter circuitry for detecting commutation.

In FIG. 6 the upper curve form shows the unfiltered signal over the measuring resistor 19 measured between the points 17, 18. In the specific measurements shown, the measuring resistor 19 was simply 15 centimeters of supply wire 11. No discrete resistor component 19 was used.

The lower curve form in FIG. 6 shows the signal measured between point 17 and the signal output point 25 on the left-hand side of the Wheatstone's bridge 20.

Figure 7:
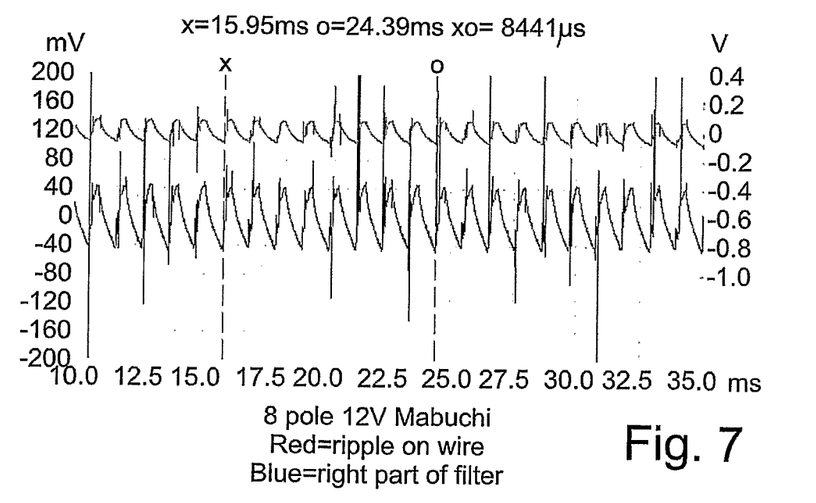

In FIG. 7 the upper curve form shows the same unfiltered signal over the measuring resistor 19 measured between the points 17, 18, as the upper curve form in FIG. 6.

The lower curve form in FIG. 7 shows the signal measured between point 17 and a reference point 26 on the right-hand side of the Wheatstone's bridge 20.

Figure 8:
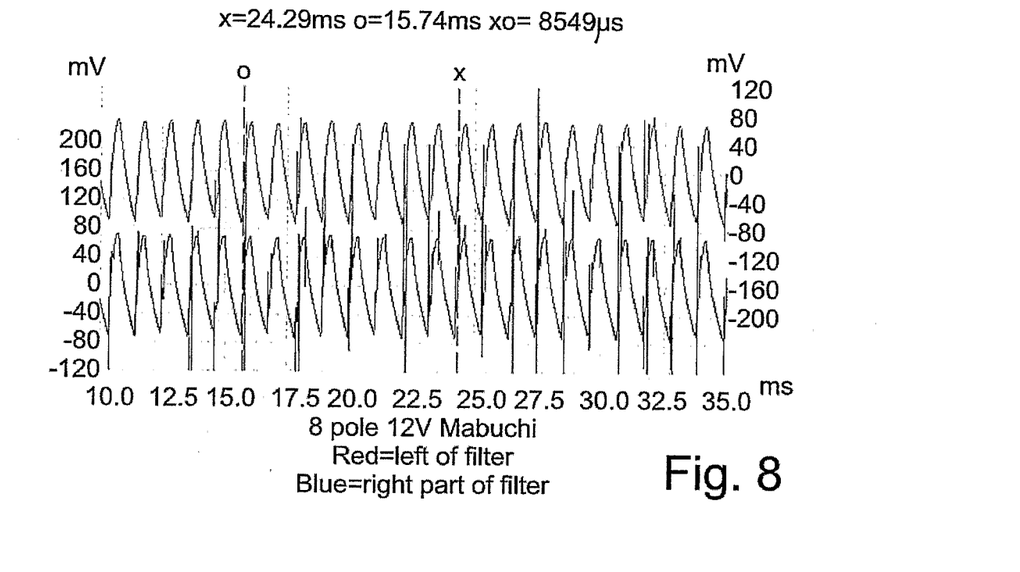

FIG. 8 illustrates the curve forms measured between the signal output point 25 and the reference point 26 of the Wheatstone's bridge 20, and ground 27, respectively. The upper curve form being between the signal output point 25 and ground 27, and the lower being between the reference point 26 and ground 27.

The output signals from the signal output point 25 and the reference point 26 of the Wheatstone's bridge 20, respectively, are supplied to the low pass filter 21 and amplifier 22.

Figure 9:
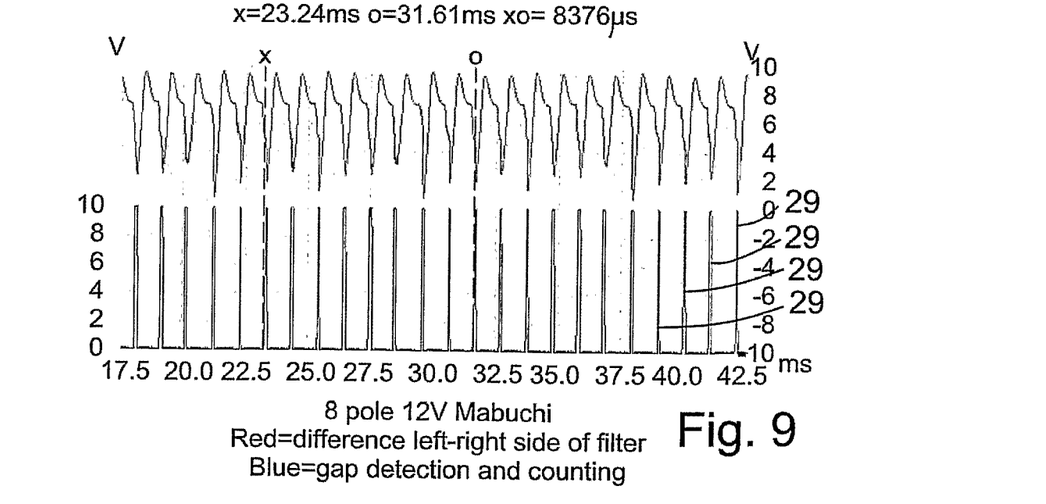

The upper curve form in FIG. 9 illustrates the low pass filtered output signal from the amplifier 22, measures between the output terminal 28 and ground 27.

The output signal from the amplifier 22 is supplied to the differentiator 23, which yields the lower curve form of FIG. 9. It can be seen that this curve form comprises one well defined spike 29 per commutation, which is readily available as e.g. a reset signal for the microprocessor 13. Looking carefully at the shape of the individual spikes 29, the skilled person will recognize that not only are the spikes 29 well defined, but have in fact individually distinguishable features in the repetitive pattern corresponding to the 8 poles of the mechanically commutated motor.

Figure 10:
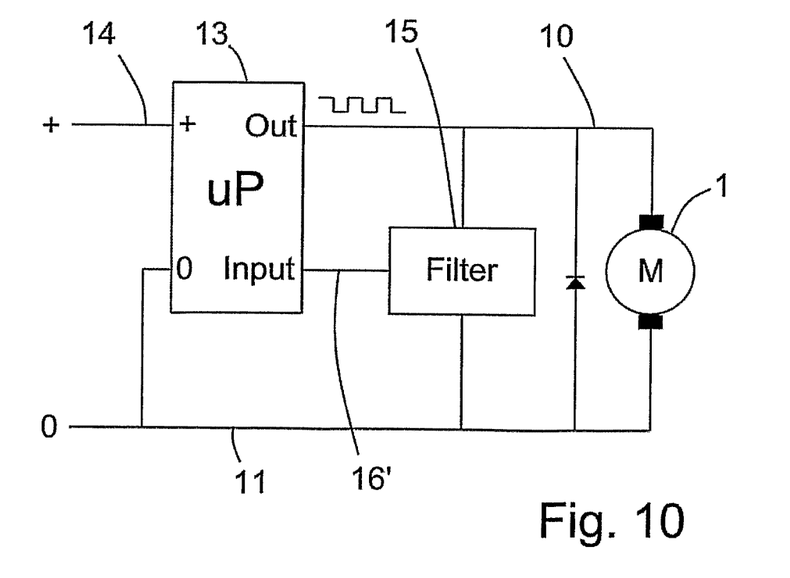

Investigation has shown that such a repetitive pattern exists for all mechanically commutated motors, and is unique to each individual motor, reflecting differences in the commutation process for each pole. Using the microprocessor, as illustrated in FIG. 10 where the output signal from the filter 15 is delivered to another input 16', rather than just to the reset input 16, it is possible to record this pattern for each individual motor, thus making an individual characteristic of how the motor commutates. This is particularly interesting when each motor is delivered with its own integrated microprocessor based controller. Having the microprocessor 13 available, the pattern including the characteristics of each commutation spike may be recorded and stored for each produced mechanically commutated motor 1. Having the pattern and characteristics stored for a mechanically commutated motor 1, allows the identification of any changes to the motor. E.g. if one magnetizing winding fails, the missing spike would readily be discoverable. However, as the characteristics of the spikes are also recorded and stored, it becomes possible to monitor the wear on in particular the commutator over the lifetime of the commutated electric motor 1. It also becomes possible to define a reference point for the motor 1, e.g. by defining one readily distinguishable commutation as the reference, or even by manufacturing the motor 1 to have such an readily distinguishable commutation. The latter could be done by making one air gap 6, 7 between the contact pads 4, 5 of the commutator larger than the others, resulting in a temporal displacement of the commutation spike with respect to the other, basically equidistant spikes.

Moreover the trigger signal can be used to trigger other measurement, such as the waveform of the supply current between successive commutations, in order to gain additional useful information for characterising the mechanically commutated electric motor.

Though the above description has been given based on specific exemplary embodiments the skilled person will realise that numerous deviations and variants are possible within the scope of the invention. Thus, the skilled person will realise that other filters than the analogue filter illustrated are possible, and in particular that parts of the filter may be implemented as digital filtering in the microprocessor or like components. The skilled person will also understand that power supply is to be understood in the broadest sense, and could inter alia just comprise a power source with or without modulation, and a simple electronic switch controlled by the output signal of the filter.

The invention claimed is:

1. A method for controlling the power supply to a mechanically commutated electric motor in response to the commutation of the mechanically commutated electric motor, said method comprising the steps of:
    providing a mechanically commutated electric motor,
    providing a power supply for said mechanically commutated electric motor via electrical supply leads from power supply circuitry,
    providing a filter connected to at least one of said electrical supply leads,
    detecting with said filter a voltage spike occurring at commutation,
    outputting from said filter said trigger signal,
    using said trigger signal as a stop signal to the power supply, and
    halting temporarily said power supply to said mechanically commutated electric motor in response to said stop signal.

2. A method according to claim 1, wherein said power supply circuitry comprises a pulse modulating circuitry, and said stop signal is used as a reset signal for said pulse modulating circuitry.

3. A method according to claim 2, wherein a predetermined delay of the operation of the pulse modulating circuitry is provided after said reset.

4. A method according to claim 2, wherein said pulse modulating circuitry provides pulse width modulated power.

5. A method according to claim 1, wherein said power supply circuitry comprises a microprocessor.

6. A power supply system for a mechanically commutated electric motor, said power supply system comprising
    power supply circuitry,
    electrical supply leads for conducting electrical power from said power supply circuitry to a mechanically commutated electric motor,
    a filter connected to said electrical supply leads,
    a line for transmitting a trigger signal outputted from said filter as a stop signal to the power supply, and
    wherein said power supply circuitry comprises means for receiving said stop signal and means for halting temporarily the power supply to said mechanically commutated electric motor in response to said stop signal.

7. A system according to claim 6, wherein said power supply circuitry comprises a pulse modulating circuitry and said means for receiving said stop signal is a reset input of said pulse modulating circuitry.

8. A system according to claim 7, wherein means are provided for introducing a predetermined delay of the operation of the pulse modulating circuitry after said reset.

9. A system according to claim 7, wherein said pulse modulating circuitry is adapted to provided pulse width modulated power.

10. A system according to claim 6, wherein said power supply circuitry comprises a microprocessor.

11. A method for monitoring a mechanically commutated electric motor, said method comprising the steps of:
    providing a mechanically commutated electric motor,
    providing a microprocessor,
    providing a power supply for said mechanically commutated electric motor via electrical supply leads from power supply circuitry,
    providing a filter connected to at least one of said electrical supply leads,
    detecting with said filter a voltage spike occurring at commutation,
    outputting from said filter a trigger signal to said microprocessor, and
    identifying and storing by means of said microprocessor, temporal information about the occurrence of said voltage spikes for a number of commutations, so as to determine a pattern.

12. A method according to claim 11, wherein said temporal information comprises the temporal spacing between said voltage spikes.

13. A method according to claim 11, wherein said temporal information comprises the width of said voltage spikes.

14. A method according to claim 11, wherein said temporal information comprises the curve shape of the spikes over their respective duration.

15. Method according to claim 11, further comprising the detection of subsequent voltage spikes, and comparison of the respective temporal information related to said spikes with said pattern.

16. Method according to claim 15, wherein precautions are taken if said subsequent spikes do not match said pattern.

17. Method according to claim 16, wherein said precautions comprise issuance of a warning.

18. Method according to claim 15, wherein an angular position of the mechanically commutated motor is determined based on said detection of subsequent voltage spikes.

* * * * *